(12) United States Patent
Johnson

(10) Patent No.: US 6,487,781 B2
(45) Date of Patent: Dec. 3, 2002

(54) BORE PATH ALIGNMENT SYSTEM

(76) Inventor: Clifford C. Johnson, 1217 - 23rd St. SE., Mandan, ND (US) 58554

( * ) Notice: Subject to any disclaimer, the term of this patent is extended or adjusted under 35 U.S.C. 154(b) by 0 days.

(21) Appl. No.: 09/825,095

(22) Filed: Apr. 2, 2001

(65) Prior Publication Data

US 2002/0138994 A1 Oct. 3, 2002

(51) Int. Cl.[7] .................................................. G01C 5/00
(52) U.S. Cl. .............................. 33/285; 33/286; 33/290; 33/293; 248/530
(58) Field of Search .......................... 33/1 H, 1 N, 285, 33/286, 290, 292, 293, 294, 295, 296, 521; 52/117, 118; 135/114; 403/109.1; 248/511, 519, 530

(56) References Cited

U.S. PATENT DOCUMENTS

| | | | | |
|---|---|---|---|---|
| 341,690 A | * | 5/1886 | Reichenbach | 33/290 |
| 765,871 A | * | 7/1904 | Akins | 33/290 |
| 1,262,985 A | * | 4/1918 | Rodgers | 33/293 |
| 1,976,264 A | * | 10/1934 | Miner | 33/293 |
| 2,896,324 A | * | 7/1959 | Thomann | 33/293 |
| 2,941,297 A | * | 6/1960 | Howley et al. | 33/292 |
| 3,314,068 A | * | 4/1967 | Verive | 33/293 |
| 3,442,016 A | * | 5/1969 | Kaye | 33/293 |
| 3,967,381 A | * | 7/1976 | Chesbro | 33/1 H |
| 4,029,415 A | * | 6/1977 | Johnson | 33/294 |
| 5,983,511 A | * | 11/1999 | Osaragi et al. | 33/290 |

FOREIGN PATENT DOCUMENTS

| | | | | |
|---|---|---|---|---|
| GB | 2153527 A | * | 8/1985 | 33/293 |
| JP | 56-11308 A | * | 4/1981 | 33/293 |

* cited by examiner

*Primary Examiner*—G. Bradley Bennett

(57) ABSTRACT

A bore path alignment system for accurately determining a desired bore pitch for a ground-boring device. The bore path alignment system includes a first pole, a first tube adjustably positioned upon the first tube, a guide tube with a pitch instrument pivotally attached to the first tube, a second pole, and a second tube including a spotter strip adjustably positioned upon the first tube. The user positions the first pole into the ground surface where boring is to begin and the second pole above a location where a specific depth is required. The user positions the second tube containing the spotter strip according to the depth in the second location. The user then adjusts the angle of the guide tube until the spotter strip is aligned thereby allowing the user to determine the required boring pitch by the pitch instrument.

14 Claims, 9 Drawing Sheets

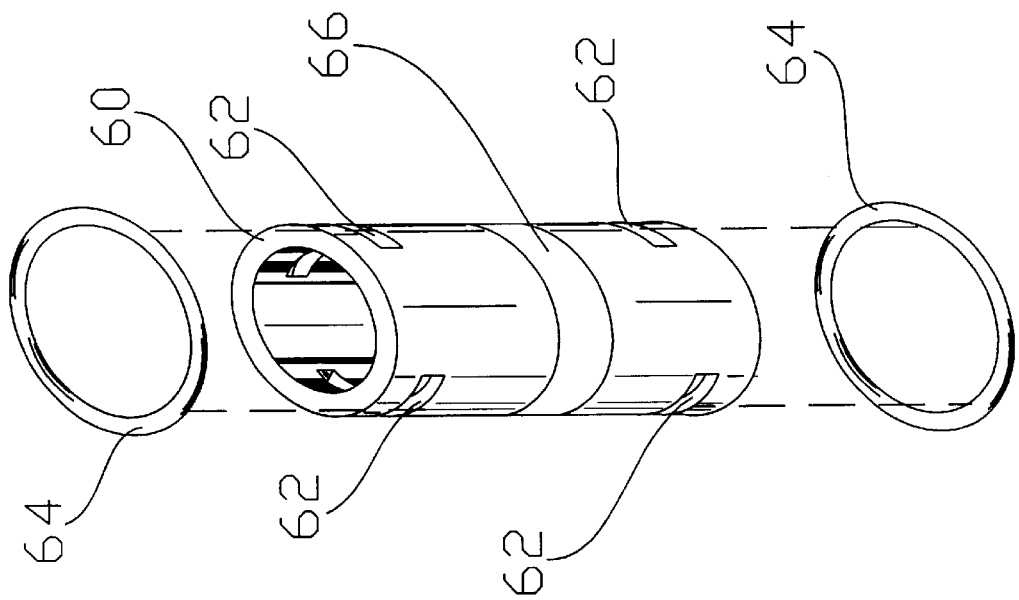
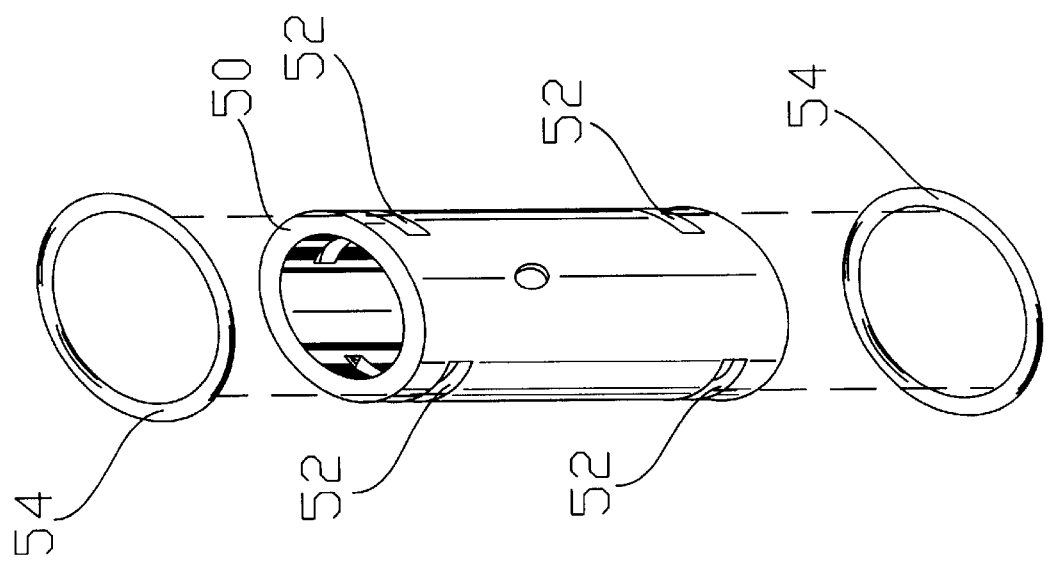
FIG. 9

BORE PATH ALIGNMENT SYSTEM

BACKGROUND OF THE INVENTION

1. Field of the Invention

The present invention relates generally to ground boring systems and more specifically it relates to a bore path alignment system for accurately determining a desired bore pitch for a ground-boring device.

2. Description of the Prior Art

Directional ground boring devices have been in use for years. Typically, a ground-boring unit is comprised of a base structure, a motor, and a shaft having a bit. The base structure supports the shaft at an adjustable pitch for boring through the ground.

The main problem with conventional ground boring devices is that they are relatively difficult to align the pitch to avoid objects within the ground such as power lines and gas lines. Another problem with conventional ground boring devices is that they often times engage objects within the ground. A further problem with conventional boring devices is that they require the user to "guess" as to the desired boring pitch based upon the surface terrain that can be difficult to ascertain.

While these devices may be suitable for the particular purpose to which they address, they are not as suitable for accurately determining a desired bore pitch for a ground boring device. Conventional ground boring systems require the user to "guess" as to the proper boring pitch to utilize.

In these respects, the bore path alignment system according to the present invention substantially departs from the conventional concepts and designs of the prior art, and in so doing provides an apparatus primarily developed for the purpose of accurately determine a desired bore pitch for a ground boring device.

SUMMARY OF THE INVENTION

In view of the foregoing disadvantages inherent in the known types of ground boring systems now present in the prior art, the present invention provides a new bore path alignment system construction wherein the same can be utilized for accurately determining a desired bore pitch for a ground boring device.

The general purpose of the present invention, which will be described subsequently in greater detail, is to provide a new bore path alignment system that has many of the advantages of the ground boring systems mentioned heretofore and many novel features that result in a new bore path alignment system which is not anticipated, rendered obvious, suggested, or even implied by any of the prior art ground boring systems, either alone or in any combination thereof.

To attain this, the present invention generally comprises a first pole, a first tube adjustably positioned upon the first tube, a guide tube with a pitch instrument pivotally attached to the first tube, a second pole, and a second tube including a spotter strip adjustably positioned upon the first tube. The user positions the first pole into the ground surface where boring is to begin and the second pole above a location where a specific depth is required. The user positions the second tube containing the spotter strip according to the depth in the second location. The user then adjusts the angle of the guide tube until the spotter strip is aligned thereby allowing the user to determine the required boring pitch by the pitch instrument.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a bore path alignment system that will overcome the shortcomings of the prior art devices.

A second object is to provide a bore path alignment system for accurately determining a desired bore pitch for a ground-boring device.

Another object is to provide a bore path alignment system that allows for accurately boring above or below objects and utilities such as gas lines, water lines, telephone lines, and power lines.

An additional object is to provide a bore path alignment system that increases the efficiency of a bore job.

A further object is to provide a bore path alignment system that makes directional boring more accurate and easier.

Another object is to provide a bore path alignment system that is easy and simple to understand and operate.

A further object is to provide a bore path alignment system that is able to accurately determine the depth of a ditch and the pitch of a slope.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein:

FIG. 9 is an exploded upper perspective view of the first tube and the second tube.

DESCRIPTION OF THE PREFERRED EMBODIMENT

Figure 1:
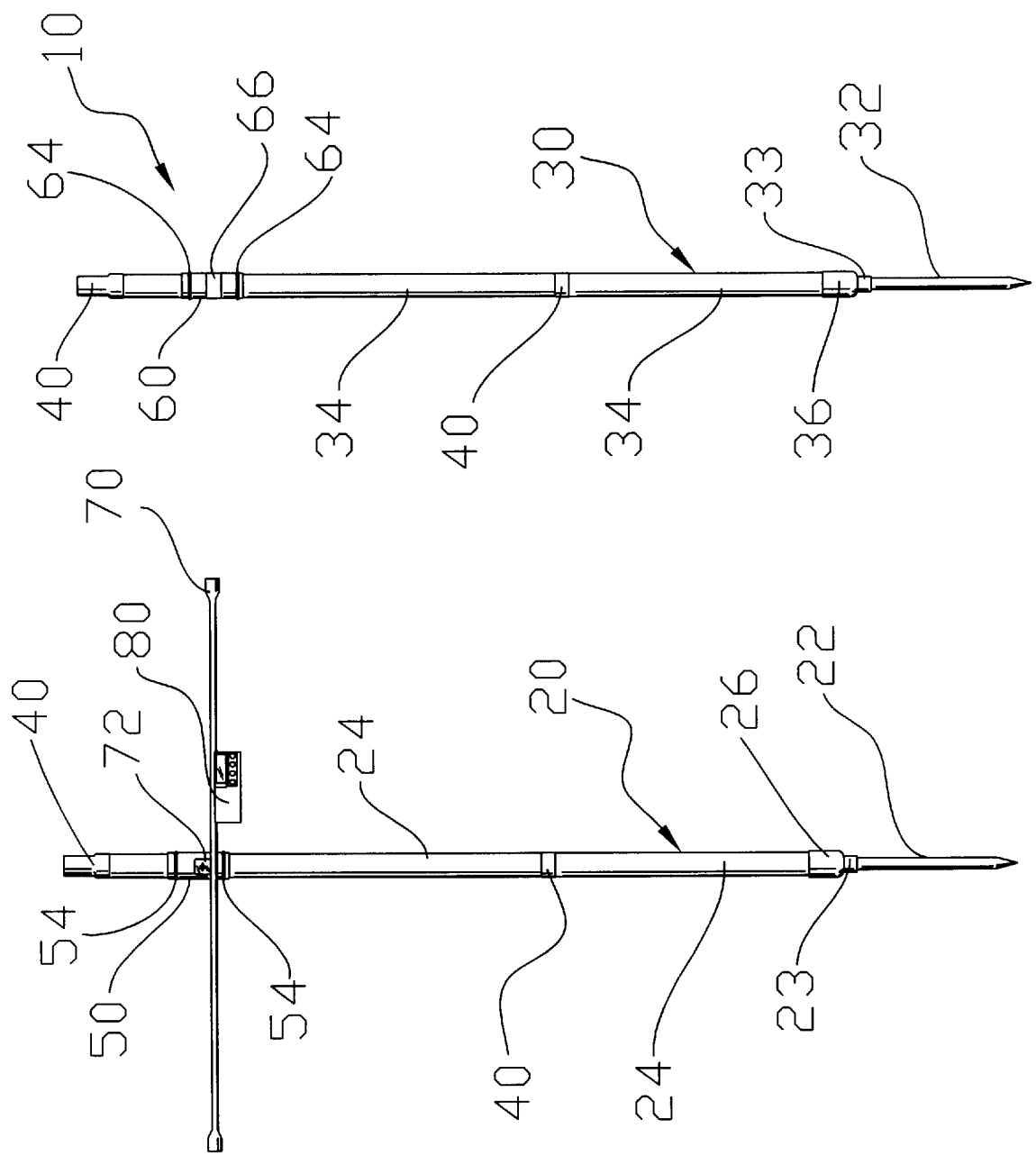
FIG. 1 is a side view of the first pole and the second pole.

Turning now descriptively to the drawings, in which similar reference characters denote similar elements throughout the several views, FIGS. 1 through 9 illustrate a bore path alignment system 10, which comprises a first pole 20, a first tube 50 adjustably positioned upon the first tube 50, a guide tube 70 with a pitch instrument 80 pivotally attached to the first tube 50, a second pole 30, and a second tube 60 including a spotter strip 66 adjustably positioned upon the first tube 50. The user positions the first pole 20 into the ground surface 12 where boring is to begin and the second pole 30 above a location where a specific depth is required. The user positions the second tube 60 containing the spotter strip 66 according to the depth in the second location. The user then adjusts the angle of the guide tube 70 until the spotter strip 66 is aligned thereby allowing the user to determine the required boring pitch by the pitch instrument 80.

As shown in FIGS. 1 through 8 of the drawings, the first pole 20 is comprised of an elongate structure. The first pole 20 is comprised of at least one first segment 24 that are "stackable" upon one another using one or more couplers 40 attached to an upper end thereof. The lowest first segment 24 preferably includes a first spike 22.

Figure 6:
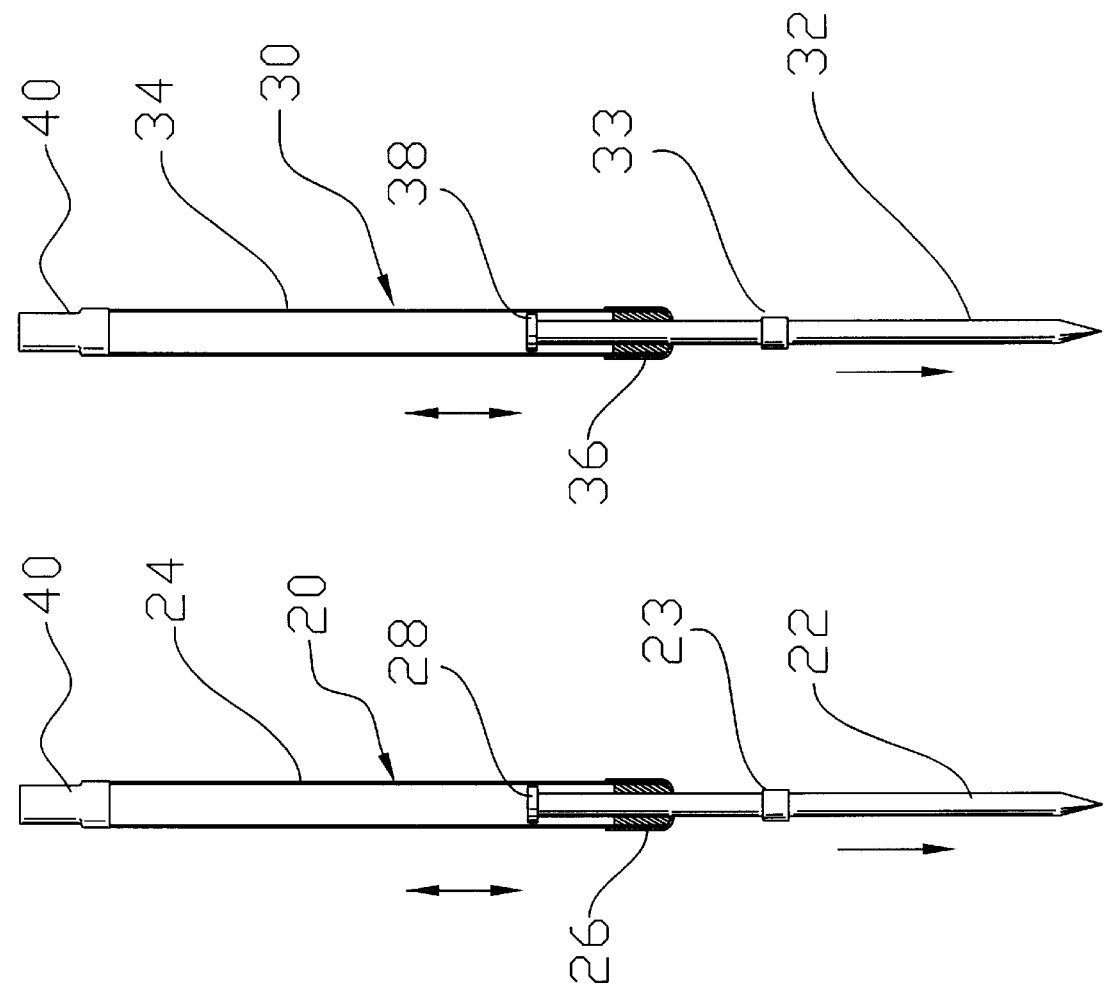
FIG. 6 is a side cutaway view of the first pole and the second pole.

The first spike 22 may be non-movably or movably positioned within the first segment 24. If the first spike 22 is movably positioned within the first segment 24, a first cincture 23 surrounds a portion of the first spike 22 to receive a first lower end 26 of the first segment 24 thereby allowing the first spike 22 to be driven into the ground surface 12 as shown in FIG. 6 of the drawings. A first flanged end 28 of the first spike 22 prevents the first spike 22 from being removed from the first segment 24.

As shown in FIGS. 1 through 5 of the drawings a first tube 50 is slidably positioned about the first pole 20. The first tube 50 preferably includes a plurality of first slots 52 that receive a portion of first band members 54 thereby providing resistance for the first tube 50 upon the first pole 20 while allowing the first tube 50 to be adjusted upon the first pole 20 during utilization as best shown in FIG. 9 of the drawings. The first band members 54 are preferably comprised of a resilient material such as but not limited to rubber.

As best shown in FIGS. 1 through 5 of the drawings, a guide tube 70 is pivotally attached to the first tube 50 by a pivot hinge 72. The pivot hinge 72 allows the guide tube 70 to be pivoted about a vertical plane with respect to the first pole 20. A pitch instrument 80 is attached to the guide tube 70 for indicating the angle (pitch) of the guide tube 70 with respect to ground. The pitch instrument 80 may be comprised of any well-known pitch measuring device such as but not limited to the SMARTTOOL manufactured by M-D American. Various other pitch measuring devices may be utilized to construct the pitch instrument 80.

Figure 2:
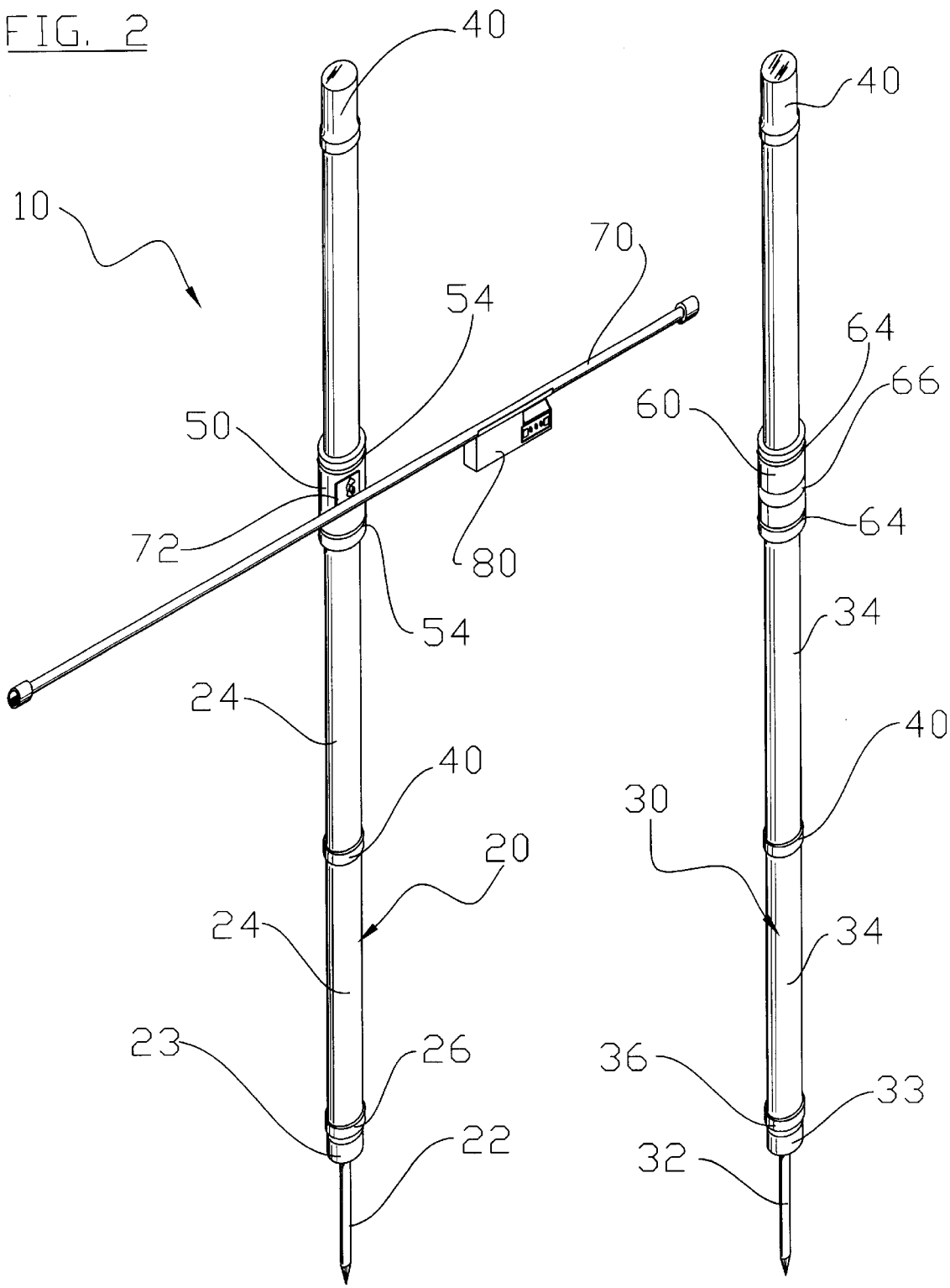
FIG. 2 is an upper perspective view of the first pole and the second pole.
Figure 3:
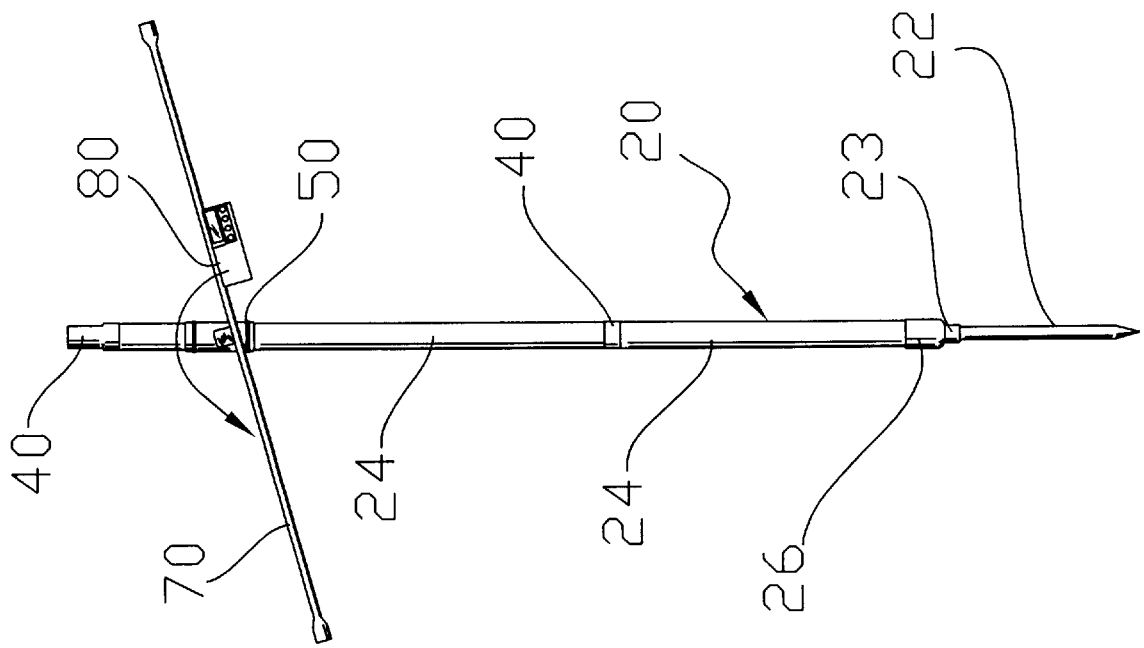
FIG. 3 is a side view of the first pole and the guide tube.
Figure 4:
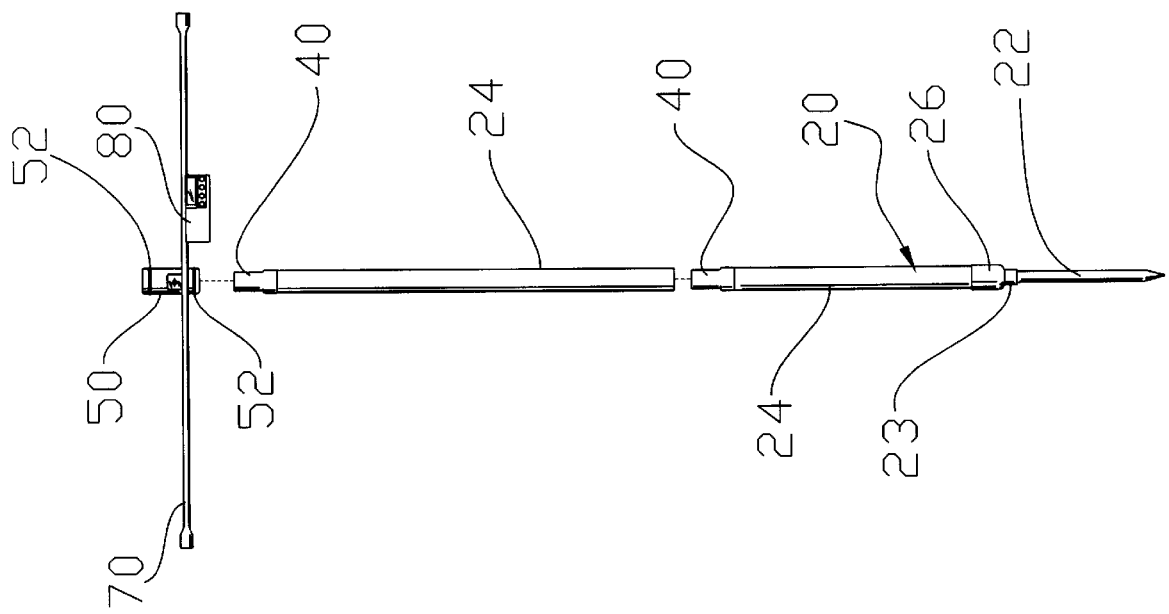
FIG. 4 is an exploded side view of the first pole and guide tube.
Figure 5:
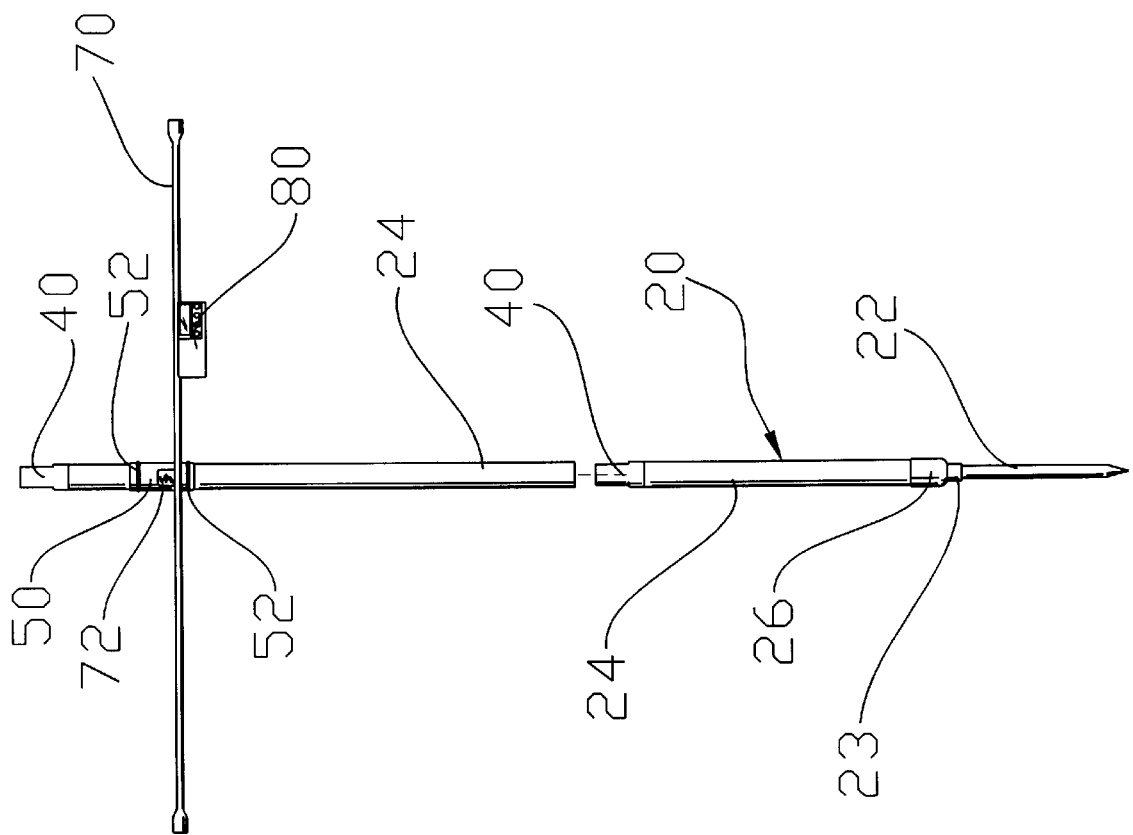
FIG. 5 is an exploded side view of the first pole illustrating the first segments removed from one another.

As shown in FIGS. 1 and 2 of the drawings, the second pole 30 is comprised of an elongate structure. The second pole 30 is comprised of at least one second segment 34 that are "stackable" upon one another using one or more couplers 40 attached to an upper end thereof. The lowest second segment 34 preferably includes a second spike 32.

The second spike 32 may be non-movably or movably positioned within the second segment 34. If the second spike 32 is movably positioned within the second segment 34, a second cincture 33 surrounds a portion of the second spike 32 to receive a second lower end 36 of the second segment 34 thereby allowing the second spike 32 to be driven into the ground surface 12 as shown in FIG. 6 of the drawings. A second flanged end 38 of the second spike 32 prevents the second spike 32 from being removed from the second segment 34.

As shown in FIGS. 1 and 2 of the drawings a second tube 60 is slidably positioned about the second pole 30. The second tube 60 preferably includes a plurality of second slots 62 that receive a portion of second band members 64 thereby providing resistance for the second tube 60 upon the second pole 30 while allowing the second tube 60 to be adjusted upon the second pole 30 during utilization as best shown in FIG. 9 of the drawings. The second band members 64 are preferably comprised of a resilient material such as but not limited to rubber. As shown in FIGS. 1, 2 and 9 of the drawings, a spotter strip 66 is positioned about the outer circumference of the second tube 60 for providing an indicator line for a user looking through the guide tube 70.

Figure 7:
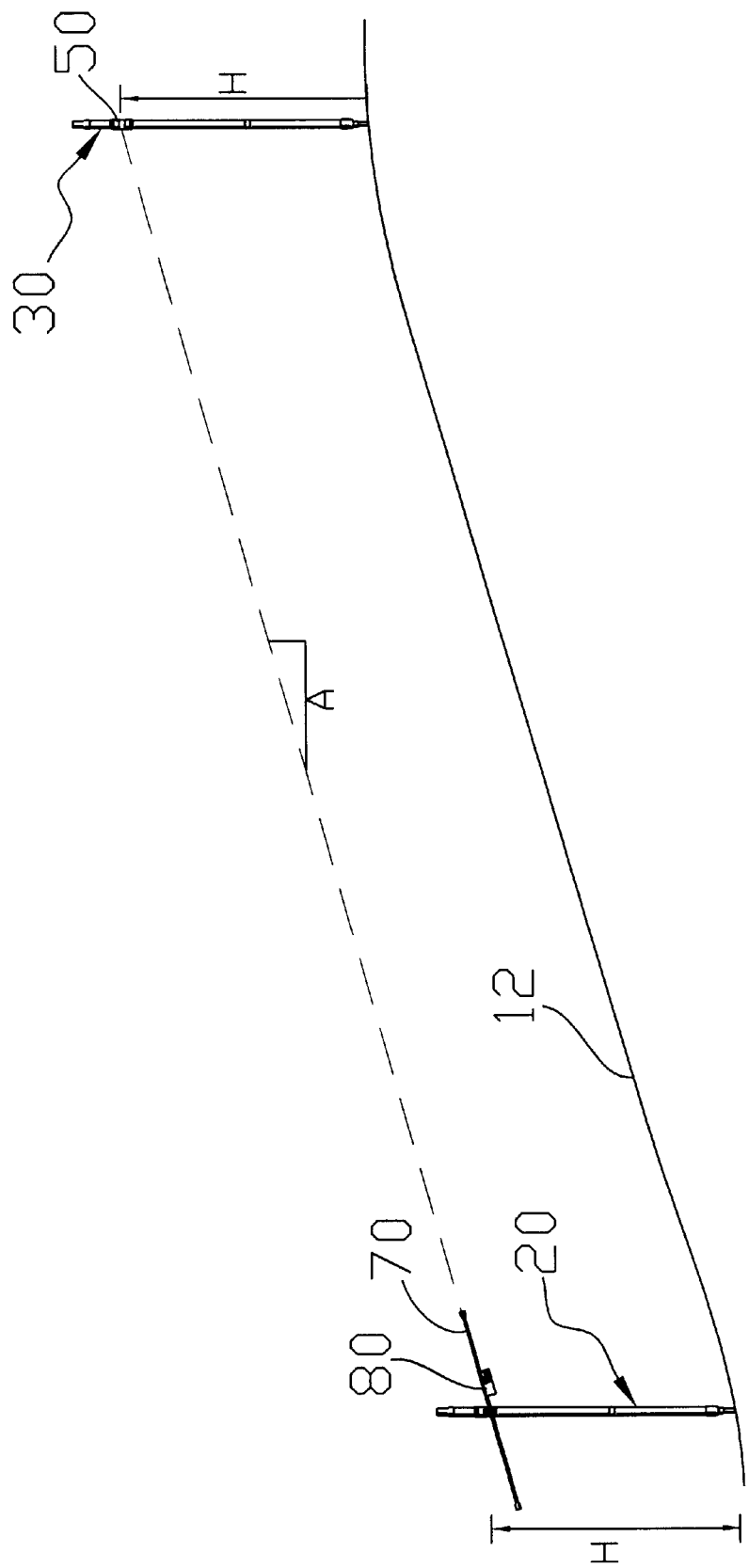
FIG. 7 is a side view of the present invention being utilized to measure the pitch of a ground slope.
Figure 8:
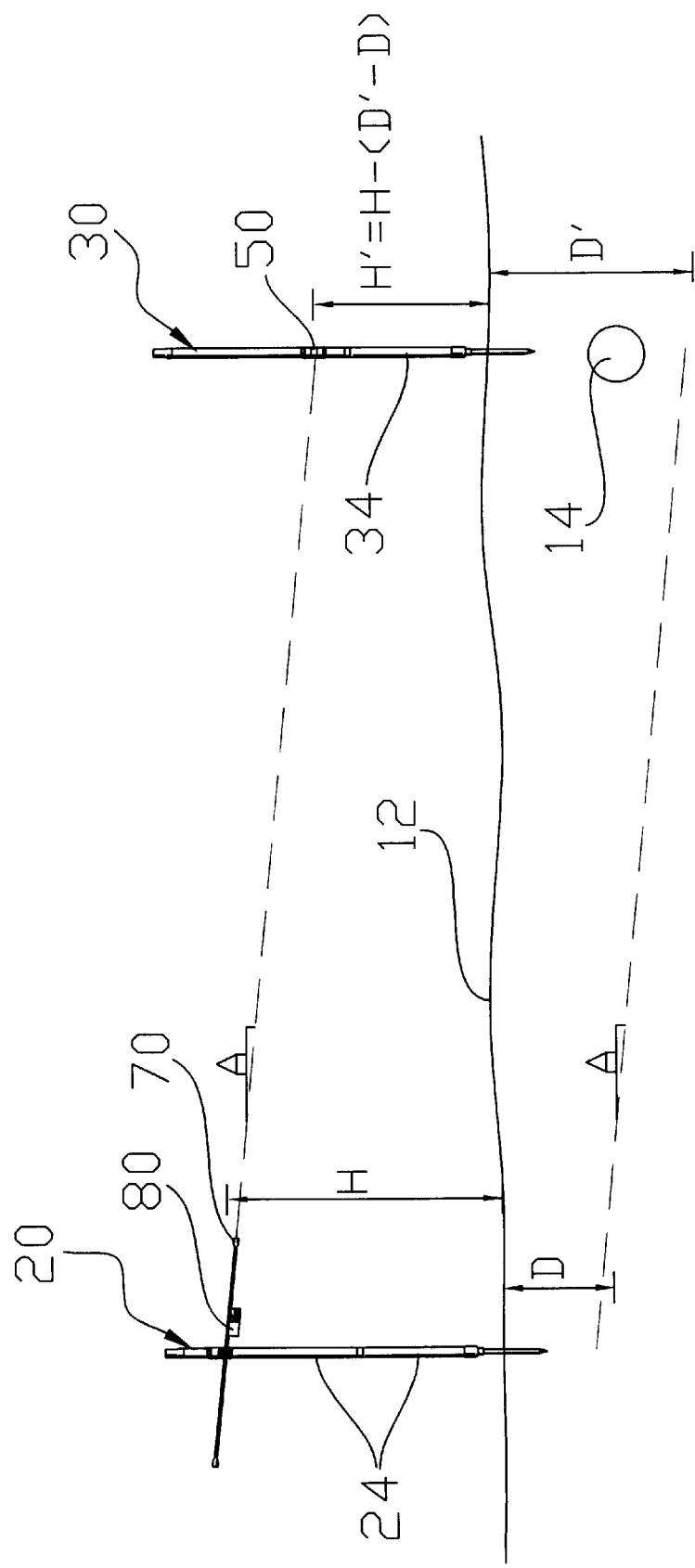
FIG. 8 is a side view of the present invention being utilized to determine the boring pitch required to achieve a desired depth below a utility line.

In use, the user inserts the first pole 20 in the location where boring is to begin (hereinafter "first location") and the second pole 30 in the location where a desired depth is to be achieved such as above or below a utility line 14 (hereinafter "second location") as shown in FIGS. 7 and 8 of the drawings. As shown in FIG. 7 of the drawings, if the user desires to determine the angle (pitch) of a slope, the user simply positions the first tube 50 and the second tube 60 at equal distances (H) above the ground surface 12 and then views the spotter strip 66 through the guide tube 70 wherein the pitch instrument 80 will indicate the approximate slope, pitch or angle of the ground surface 12 from the first location to the second location. The user then knows how to set the pitch of the boring machine to ensure that the bore is not too shallow or too deep.

If the user desires to avoid a utility line 14 or other object within the ground, the user first determines the depth of the utility line 14 and thereafter the required depth of the bore about the utility line 14 whether above or below the utility line 14. The user then repositions the height of the second tube 60 (H') based upon the height (H) of the first tube 50 minus the second depth in the second position (D') subtracted from the first depth of the bore in the first position (D) resulting in the following formula:

$$H'=H-(D'-D)$$

Once the second height (H') is determined, the user moves the second tube 60 to the second height (H') and then determines the required pitch for the bore using the guide tube 70 and the pitch instrument 80 as shown in FIG. 8 of the drawings.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed to be within the expertise of those skilled in the art, and all equivalent structural variations and relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A bore path alignment system, comprising:

a first pole having a first spike;

a first tube slidably positioned about said first pole;

a pitch measuring device pivotally attached to said first tube;

a second pole having a second spike;

a second tube slidably positioned about said second pole; and at least one spotter strip attached to said second tube which is viewed through said pitch measuring device;

wherein said first pole is comprised of a plurality of first segments removably attached to one another by at least one coupler;

wherein said first spike is slidably positioned within said first pole, wherein said first spike includes a first cincture and wherein said first pole includes a first lower end for striking said first cincture for driving said first spike into a ground surface.

2. The bore path alignment system of claim 1, wherein said first spike includes a first flanged end.

3. The bore path alignment system of claim 1, wherein said first tube includes at least one first slot and at least one first band member partially positioned within said first slot for frictionally engaging said first pole.

4. The bore path alignment system of claim 1, wherein said first tube includes an upper pair of slots, an upper band member partially positionable within said upper pair of slots, a lower pair of slots, a lower band member partially positionable within said lower pair of slots.

5. The bore path alignment system of claim 1, wherein said pitch measuring device is comprised of a guide tube pivotally attached to said first tube for viewing said spotter strip and a pitch instrument attached to said guide tube.

6. The bore path alignment system of claim 1, wherein said second pole is comprised of a plurality of second segments removably attached to one another by at least one coupler.

7. The bore path alignment system of claim 1, wherein said second spike is movably positioned within said second pole.

8. The bore path alignment system of claim 7, wherein said second spike includes a second cincture and wherein said second pole includes a second lower end for striking said second cincture for driving said second spike into a ground surface.

9. The bore path alignment system of claim 8, wherein said second spike includes a second flanged end.

10. The bore path alignment system of claim 1, wherein said second tube includes at least one second slot and at least one second band member partially positioned within said second slot for frictionally engaging said second pole.

11. The bore path alignment system of claim 1, wherein said second tube includes an upper pair of slots, an upper band member partially positionable within said upper pair of slots, a lower pair of slots, a lower band member partially positionable within said lower pair of slots.

12. A method of determining a bore pitch prior to boring utilizing a first pole with a first tube slidably positioned about thereof with a first spike, a guide tube pivotally attached to said first tube, a pitch instrument attached to said guide tube, a second pole with a second tube with a spotter strip slidably positioned about thereof with a second spike, said method comprising the steps of:

(a) inserting said first spike into a first location where boring is to begin at an initial depth (D);

(b) inserting said second spike into a second location where an end depth (D') is required;

(c) positioning said first tube at a first height (H);

(d) positioning said second tube at a second height (H') that corresponds to the difference between said end depth (D') and said initial depth (D);

(e) positioning said guide tube until said spotter strip is viewed and aligned; and (f) calculating a first pitch of said guide tube utilizing said pitch instrument.

13. The method of determining a bore pitch of claim 12, including:

(g) setting a bore pitch upon a boring machine that equals said first pitch.

14. A method of determining a pitch of a ground surface utilizing a first pole with a first tube slidably positioned about thereof with a first spike, a guide tube pivotally attached to said first tube, a pitch instrument attached to said guide tube, a second pole with a second tube with a spotter strip slidably positioned about thereof with a second spike, said method comprising the steps of:

(a) inserting said first spike into a first location;

(b) inserting said second spike into a second location;

(c) positioning said first tube at a first height (H);

(d) positioning said second tube at said first height (H);

(e) positioning said guide tube until said spotter strip is viewed and aligned; and (f) calculating a first pitch of said guide tube utilizing said pitch instrument.

* * * * *